No. 606,868. Patented July 5, 1898.
J. LLOYD
WHEEL.
(Application filed Nov. 17, 1897.)
(No Model.)
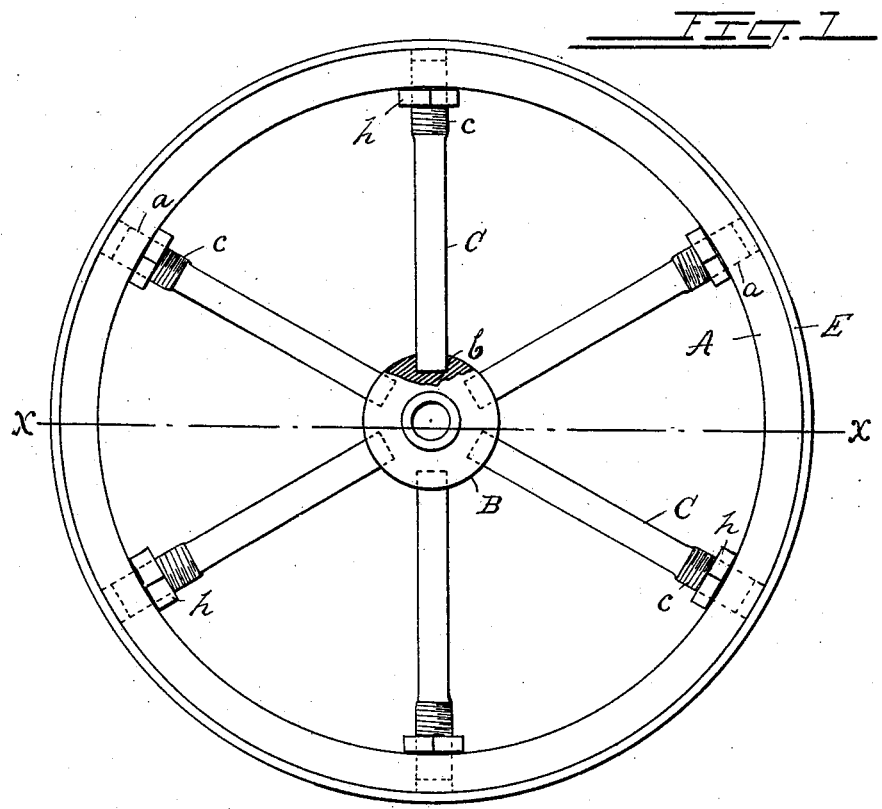
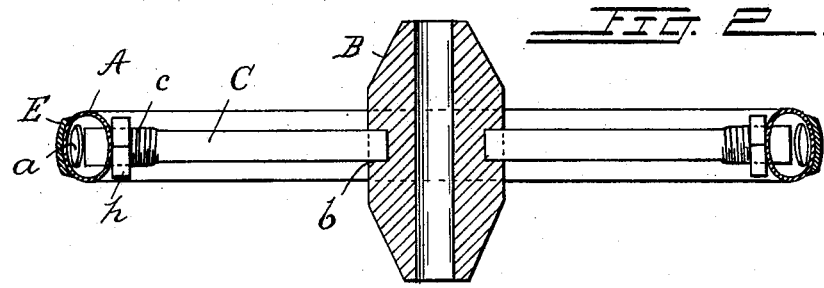
Witnesses
Lillian Kelly
Louis Allgaier
James Lloyd, Inventor
By Attorney

UNITED STATES PATENT OFFICE.

JAMES LLOYD, OF BLANDON, PENNSYLVANIA.

WHEEL.

SPECIFICATION forming part of Letters Patent No. 606,868, dated July 5, 1898.

Application filed November 17, 1897. Serial No. 658,802. (No model.)

*To all whom it may concern:*

Be it known that I, JAMES LLOYD, a citizen of the United States, residing at Blandon, in the county of Berks and State of Pennsylvania, have invented certain new and useful Improvements in Wheels; and I do hereby declare the following to be a full, clear, and exact description of the invention, such as will enable others skilled in the art to which it appertains to make and use the same.

This invention relates to improvements in wheels for use on vehicles of all kinds, and is intended as a modification of the invention described and claimed in my pending application, filed November 2, 1897, Serial No. 657,183, in which the objects of the invention are to produce a vehicle-wheel of comparatively cheap construction, one that will stand great wear and will not be affected by dry or wet weather.

The present invention is fully described in the following specification and clearly shown in the accompanying drawings, in which—

Figure 1 is a side view of my wheel. Fig. 2 is a cross-section taken on line $x\ x$ of Fig. 1.

As in the application referred to, my present wheel is of metal and mainly of tubing. The hub B is of one piece and has a series of holes $b$ arranged therein to receive the inner ends of the spokes C. The rim A is slightly flattened, so as to make it approximate an oval in cross-section, and its tread is provided with a metal tire E. The rim A is provided with a series of holes $a$, arranged on line radially with the holes $b$ in the hub B. The spokes C are enlarged at their outer ends, and these enlarged ends $c$ are screw-threaded externally. The inner ends of the spokes are passed through the holes $a$ in the rim, and a nut $h$ is passed over the end thereof. This inner end is then entered in the hole $b$ of the hub, and the nut $h$ is tightened up against the inner face of the rim A. After all the spokes have been thus entered the tire E is placed on the tread of the wheel and secured thereto by means of rivets or other suitable means. In this construction it will be seen that the spokes cannot possibly be removed without first removing the tire, and there is not likely to be any loosening of the spokes; but should there be any such loosening it can be readily taken up by tightening one nut.

Having thus fully described my invention, what I claim is—

A metal vehicle-wheel, mainly of tubing, having spokes enlarged at their outer ends, said enlarged ends being screw-threaded externally, a solid hub having a series of holes adapted to receive the inner ends of said spokes, a rim of oval cross-section having a series of holes arranged on line radially with the holes in the hub, said spokes adapted to pass through the holes in the rim before entering those in the hub, nuts for securing said spokes therein and a tire adapted to encircle said rim and close the holes therein, all substantially as set forth.

In testimony whereof I affix my signature in presence of two witnesses.

JAMES LLOYD.

Witnesses:
 ED. A. KELLY,
 LOUIS ALLGAIER.